(12) United States Patent
Hong

(10) Patent No.: US 12,628,122 B2
(45) Date of Patent: May 12, 2026

(54) METHODS AND APPARATUSES FOR SOLVING PAGING COLLISION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 521 days.

(21) Appl. No.: 18/031,339

(22) PCT Filed: Oct. 12, 2020

(86) PCT No.: PCT/CN2020/120497
§ 371 (c)(1),
(2) Date: Apr. 11, 2023

(87) PCT Pub. No.: WO2022/077189
PCT Pub. Date: Apr. 21, 2022

(65) Prior Publication Data
US 2023/0379878 A1 Nov. 23, 2023

(51) Int. Cl.
*H04W 68/02* (2009.01)

(52) U.S. Cl.
CPC .................................. *H04W 68/02* (2013.01)

(58) Field of Classification Search
CPC . H04W 60/005; H04W 68/005; H04W 68/02; H04W 76/19; H04W 8/183; H04W 88/06
See application file for complete search history.

(56) References Cited

U.S. PATENT DOCUMENTS

| | | |
|---|---|---|
| 2015/0017982 A1 | 1/2015 | Klatt |
| 2017/0196030 A1 | 7/2017 | Ma et al. |

(Continued)

FOREIGN PATENT DOCUMENTS

| | | |
|---|---|---|
| CN | 101951653 A | 1/2011 |
| CN | 107509201 A | 12/2017 |

(Continued)

OTHER PUBLICATIONS

European Patent Office, Partial Supplementary European Search Report Issued in Application No. 20956971.4, Oct. 23, 2023, Germany, 14 pages.

(Continued)

*Primary Examiner* — Nader Bolourchi
(74) *Attorney, Agent, or Firm* — Volpe Koenig

(57) ABSTRACT

The present disclosure relates to paging collision resolution methods. A method comprises: registering with a network through a first SIM; receiving a first registration success message; determining a first paging occasion (PO) corresponding to the first SIM according to the first registration success message; in response to determining that a collision occurs between the first PO and a second PO corresponding to a second SIM, sending paging collision information in registration complete information to the network through the first SIM; receiving first collision resolution information determined by the network based on the paging collision information; and updating the first PO according to the first collision resolution information.

17 Claims, 10 Drawing Sheets

Register with a network through the first SIM, receive a first registration success message, and determine a first PO corresponding to the first SIM according to the first registration success message — S101

In response to determining that a collision occurs between the first PO and a second PO corresponding to the second SIM, send paging collision information in registration complete information to the network through the first SIM — S102

Receive first collision resolution information determined by the network according to the paging collision information, and update the first PO according to the first collision resolution information — S103

(56)                References Cited

U.S. PATENT DOCUMENTS

| | | | | |
|---|---|---|---|---|
| 2017/0359772 | A1* | 12/2017 | Lee ...................... | H04W 76/28 |
| 2019/0124636 | A1 | 4/2019 | Jiang et al. | |
| 2021/0014824 | A1* | 1/2021 | Chen ................... | H04W 68/02 |
| 2022/0240213 | A1* | 7/2022 | Ly ........................ | H04W 60/04 |

FOREIGN PATENT DOCUMENTS

| | | |
|---|---|---|
| CN | 110149695 A | 8/2019 |
| CN | 111148127 A | 5/2020 |
| CN | 111294789 A | 6/2020 |
| WO | 2020/247043 A1 | 12/2020 |

OTHER PUBLICATIONS

Qualcomm Incorporated et al: "Solution for paging collision avoidance", XP051889902, SA WG2 Meeting #139E, Jun. 1-12, 2020, Elbonia, S2-2003894 (was S2-2000116), 5 pages.
ISA State Intellectual Property Office of the People's Republic of China, Written Opinion of the International Searching Authority Issued in Application No. PCT/CN2020/120497, Jul. 8, 2021, WIPO, 8 pages.
ZTE, "Updated summary of 7.2.1.1 Channel Structure for Two-step RACH", R1-1905793, 3GPP TSG RAN WG1 #96bis, Xi'an, China, Apr. 8 -12, 2019, 35 pages.
Ericsson, "PUR—Remaining open issues", R2-1915407, 3GPP TSG-RAN WG2 #108, Reno, Nevada, US, Nov. 18-22, 2019, 6 pages.
ISA State Intellectual Property Office of the People's Republic of China, International Search Report Issued in Application No. PCT/CN2020/120497, Jul. 8, 2021, WIPO, 5 pages.

3GPP TSG-SA "Study on system enablers for devices having multiple Universal Subscriber Identity Modules (USIM) (Release 17)", 3GPP TR 23.761 V1.0.0, Technical Report, Sep. 8, 2020 (Sep. 8, 2020), 84 pages.
Intel et al. "KI#2, New Sol: Paging Reception with PO collision avoidance" SA WG2 Meeting #S2-139-e, S2-2004600,Jun. 15, 2020 (Jun. 15, 2020), 4 pages.
Qualcomm Inc. "Handling of paging collision for Multi-SIM", 3GPP TSG-RAN WG2 Meeting #111-e, R2-2006944,Aug. 7, 2020 (Aug. 7, 2020), 4 pages.
3GPP TS 23.501, "System architecture for the 5G System (5GS)", V18.1.0 (Mar. 2023), 659 pages.
3GPP TS 23.502, "Procedures for the 5G System (5GS)", V18.1.1 (Apr. 2023), 75 pages.
3GPP TR 23.761, "Study on system enablers for devices having multiple Universal Subscriber Identity Modules (USIM))(Release 17)", V1.2.0 (Nov. 2020), 109 pages.
State Intellectual Property Office of the People's Republic of China, Office Action and Search Report Issued in Application No. 202080002736.6, Mar. 27, 2024, 16 pages.
Intel, Sony, OPPO, InterDigital, "Solution for Paging Reception with PO collision avoidance", SA WG2 Meeting #S2-136, Nov. 18-22, 2019, Reno, NV, US, S2-1911942, 4 pages.
Intel, Sony, OPPO, InterDigital, "Solution for Paging Reception with PO collision avoidance", SA WG2 Meeting #S2-136AH, Jan. 13-17, 2020, Incheon, KR, S2-2000164, 4 pages.
Sony, "KI2: Solution for Paging Reception with PO collision avoidance", SA WG2 Meeting #S2-136AH, Jan. 13-17, 2020, Incheon, KR, S2-2000841, 5 pages.

* cited by examiner

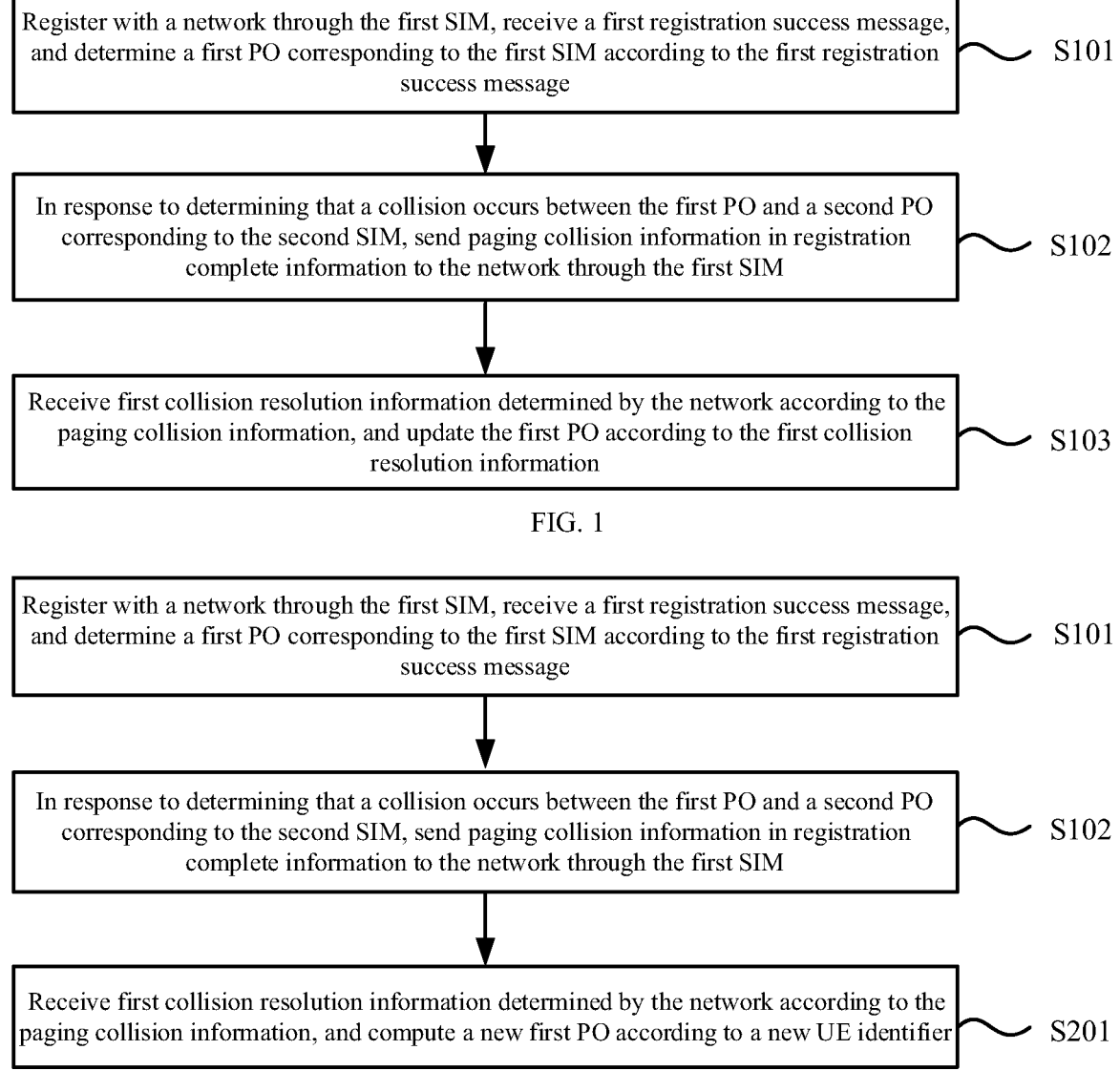

| Register with a network through the first SIM, receive a first registration success message, and determine a first PO corresponding to the first SIM according to the first registration success message | S101 |

| In response to determining that a collision occurs between the first PO and a second PO corresponding to the second SIM, send paging collision information in registration complete information to the network through the first SIM | S102 |

| Receive first collision resolution information determined by the network according to the paging collision information, and update the first PO according to the first collision resolution information | S103 |

FIG. 1

| Register with a network through the first SIM, receive a first registration success message, and determine a first PO corresponding to the first SIM according to the first registration success message | S101 |

| In response to determining that a collision occurs between the first PO and a second PO corresponding to the second SIM, send paging collision information in registration complete information to the network through the first SIM | S102 |

| Receive first collision resolution information determined by the network according to the paging collision information, and compute a new first PO according to a new UE identifier | S201 |

FIG. 2

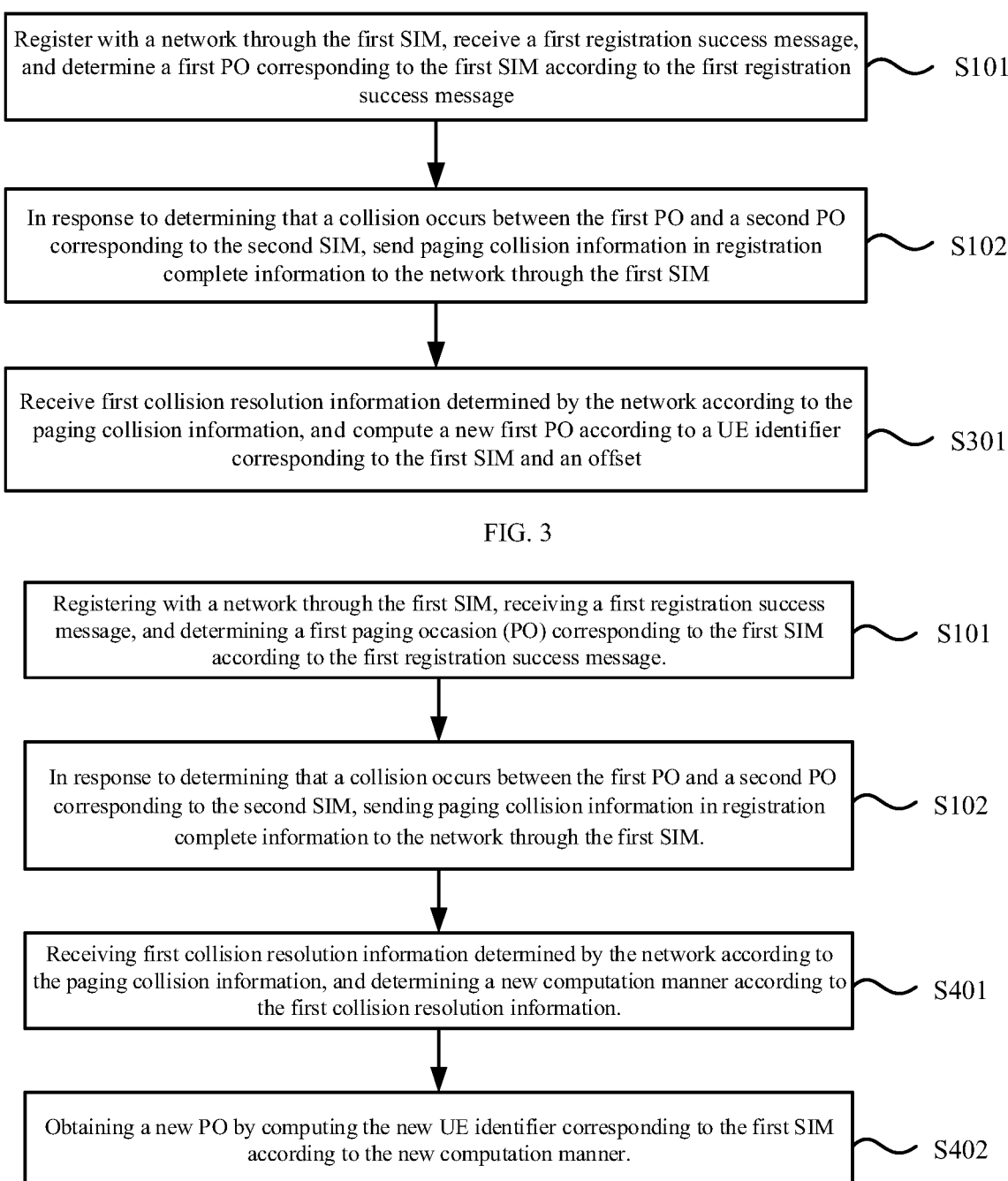

Register with a network through the first SIM, receive a first registration success message, and determine a first PO corresponding to the first SIM according to the first registration success message    S101

In response to determining that a collision occurs between the first PO and a second PO corresponding to the second SIM, send paging collision information in registration complete information to the network through the first SIM    S102

Receive first collision resolution information determined by the network according to the paging collision information, and compute a new first PO according to a UE identifier corresponding to the first SIM and an offset    S301

FIG. 3

Registering with a network through the first SIM, receiving a first registration success message, and determining a first paging occasion (PO) corresponding to the first SIM according to the first registration success message.    S101

In response to determining that a collision occurs between the first PO and a second PO corresponding to the second SIM, sending paging collision information in registration complete information to the network through the first SIM.    S102

Receiving first collision resolution information determined by the network according to the paging collision information, and determining a new computation manner according to the first collision resolution information.    S401

Obtaining a new PO by computing the new UE identifier corresponding to the first SIM according to the new computation manner.    S402

FIG. 4

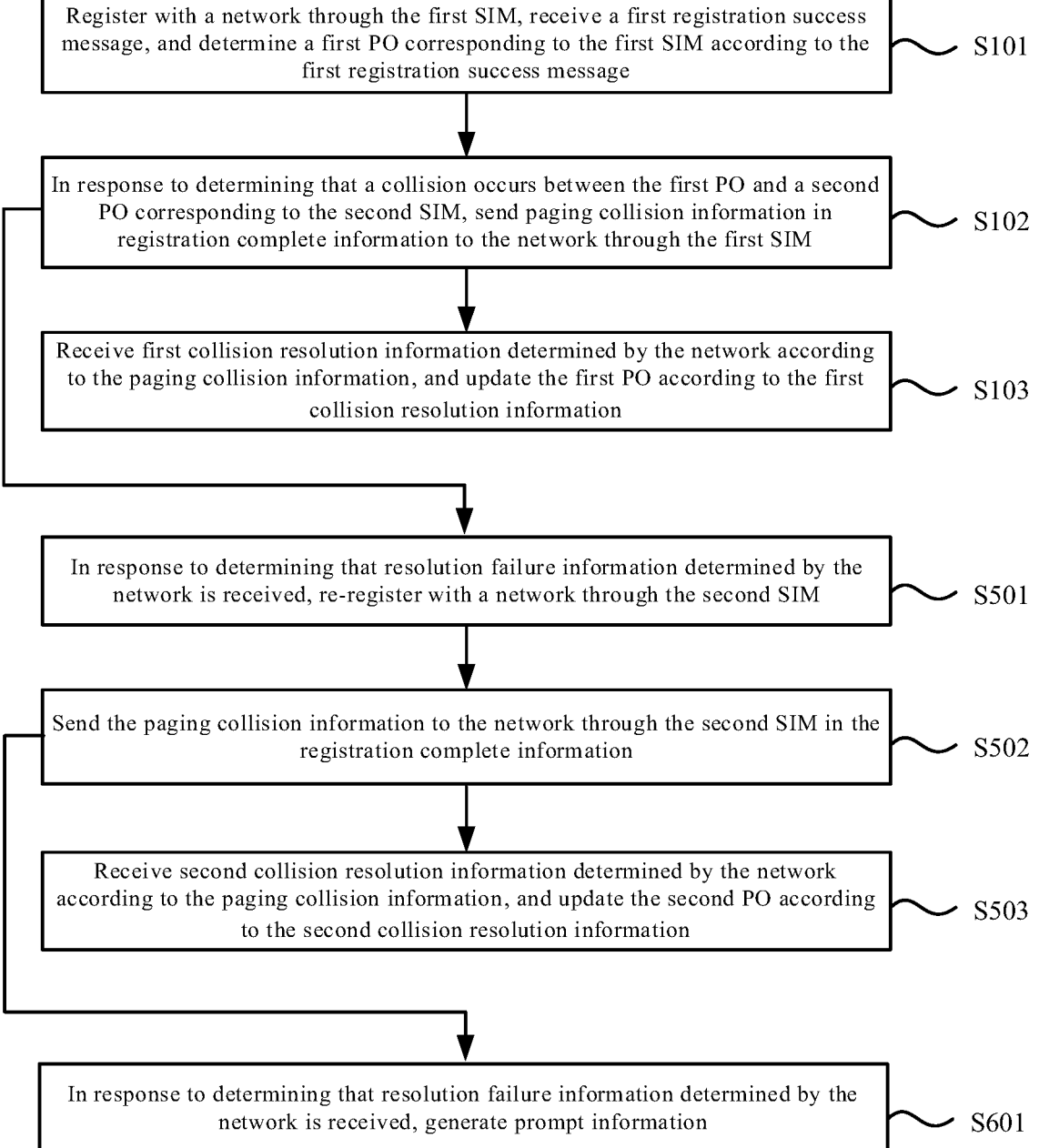

Register with a network through the first SIM, receive a first registration success message, and determine a first PO corresponding to the first SIM according to the first registration success message ~ S101

In response to determining that a collision occurs between the first PO and a second PO corresponding to the second SIM, send paging collision information in registration complete information to the network through the first SIM ~ S102

Receive first collision resolution information determined by the network according to the paging collision information, and update the first PO according to the first collision resolution information ~ S103

In response to determining that resolution failure information determined by the network is received, re-register with a network through the second SIM ~ S501

Send the paging collision information to the network through the second SIM in the registration complete information ~ S502

Receive second collision resolution information determined by the network according to the paging collision information, and update the second PO according to the second collision resolution information ~ S503

In response to determining that resolution failure information determined by the network is received, generate prompt information ~ S601

FIG. 6

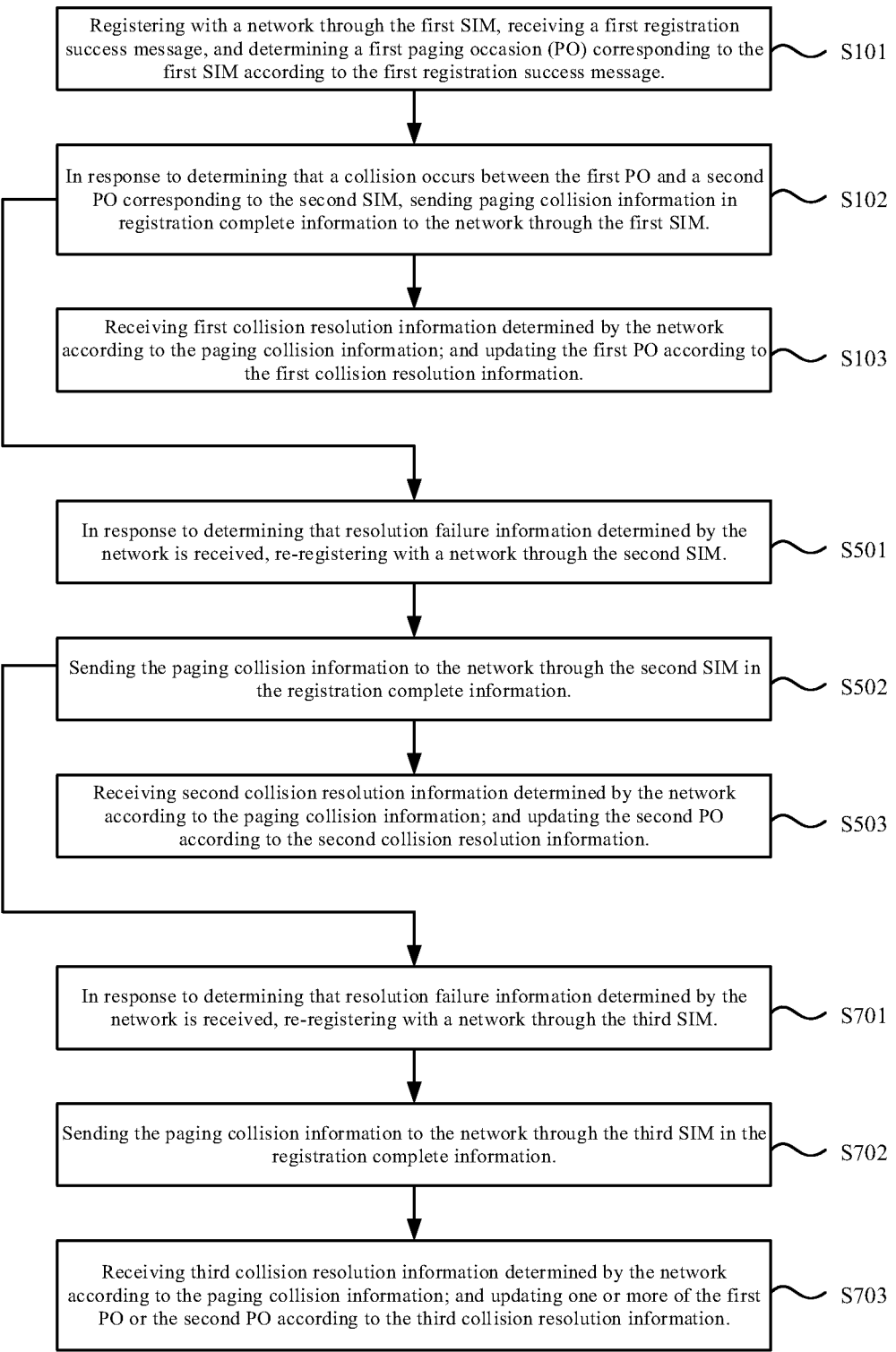

Registering with a network through the first SIM, receiving a first registration success message, and determining a first paging occasion (PO) corresponding to the first SIM according to the first registration success message.     S101

In response to determining that a collision occurs between the first PO and a second PO corresponding to the second SIM, sending paging collision information in registration complete information to the network through the first SIM.     S102

Receiving first collision resolution information determined by the network according to the paging collision information; and updating the first PO according to the first collision resolution information.     S103

In response to determining that resolution failure information determined by the network is received, re-registering with a network through the second SIM.     S501

Sending the paging collision information to the network through the second SIM in the registration complete information.     S502

Receiving second collision resolution information determined by the network according to the paging collision information; and updating the second PO according to the second collision resolution information.     S503

In response to determining that resolution failure information determined by the network is received, re-registering with a network through the third SIM.     S701

Sending the paging collision information to the network through the third SIM in the registration complete information.     S702

Receiving third collision resolution information determined by the network according to the paging collision information; and updating one or more of the first PO or the second PO according to the third collision resolution information.     S703

FIG. 7

METHODS AND APPARATUSES FOR SOLVING PAGING COLLISION

CROSS REFERENCE TO RELATED APPLICATIONS

This application is a national phase application based on PCT/CN2020/120497, filed Oct. 12, 2020, the content of which is incorporated herein by reference.

TECHNICAL FIELD

The present disclosure relates to the communication technology, and in particular, to methods, apparatuses, devices, electronic devices, and computer-readable storage media for solving paging collision.

BACKGROUND

Multiple Subscriber Identity Modules (SIMs) may be set in a terminal, that is, a multi-SIM terminal. The paging occasions (POs) for these multiple SIMs to receive paging messages may overlap and collide, thus leading to problems of receiving paging in the terminal.

The relevant technologies to solve the problems mainly include the following methods:

When a paging collision occurs, the terminal sends auxiliary information about a user equipment (UE) identifier to the network side for reference to send back a new UE identifier. However, the network side may not support the UE identifier reported by the terminal, so the network side will randomly send back a UE identifier to the terminal, and there is still a high possibility of paging collision.

The network side pre-configures an additional UE identifier for the terminal. When a paging collision occurs, the terminal requests the network side to switch UE identifier, and the terminal can switch to use this additional UE identifier. However, this method requires an additional UE identifier to be pre-configured regardless of whether there is a paging collision at the terminal, which is a waste of resources. Moreover, the pre-configured UE identifier may not necessarily avoid paging collisions during the actual use of the terminal.

When a paging collision occurs, the terminal sends an offset to the network side, and the network side determines a new UE identifier for the terminal based on the offset. However, as the terminal does not have an overall perspective, the offset it sends to the network side may cause other paging collisions to occur;

When a paging collision occurs, the terminal randomly requests a new UE identifier from the network side. This process is highly random, and it is difficult to ensure that paging collisions can be avoided based on the new UE identifier.

Therefore, it can be seen that, based on the current methods of solving paging collisions, there are more or less problems, which make it difficult to solve paging collisions in a timely and accurate manner.

SUMMARY

In view of this, the present disclosure provides methods, apparatuses, devices, electronic devices, and computer-readable storage media for solving paging collision, in order to solve technical problems in related technologies.

A method of solving paging collision is provided by the first aspect of embodiments of the present disclosure, performed by a terminal, in which at least a first SIM and a second SIM are set, which includes:

registering with a network through the first SIM; receiving a first registration success message; determining a first paging occasion (PO) corresponding to the first SIM according to the first registration success message;

in response to determining that a collision occurs between the first PO and a second PO corresponding to the second SIM, sending paging collision information in registration complete information to the network through the first SIM, wherein the second SIM has completed registration;

receiving first collision resolution information determined by the network according to the paging collision information; and updating the first PO according to the first collision resolution information.

An apparatus for solving paging collision is provided by the second aspect of embodiments of the present disclosure, performed by a terminal, in which at least a first SIM and a second SIM are set, which includes:

a first registering module, configured to register with a network through the first SIM, receive a first registration success message, and determine a first paging occasion (PO) corresponding to the first SIM according to the first registration success message;

a first information sending module, configured to send paging collision information in registration complete information to the network through the first SIM in response to determining that a collision occurs between the first PO and a second PO corresponding to the second SIM, wherein the second SIM has completed registration;

a first collision resolution module, configured to receive first collision resolution information determined by the network according to the paging collision information, and update the first PO according to the first collision resolution information.

A method of solving paging collision is provided by the third aspect of embodiments of the present disclosure, performed by a network, which includes:

receiving registration complete information sent by a first SIM in a terminal, wherein the registration complete information carries paging collision information;

determining first collision resolution information according to the paging collision information, sending the first collision resolution information to the first SIM, wherein the first collision resolution information is used to update a first paging occasion (PO) corresponding to the first SIM.

An apparatus for solving paging collision is provided by the fourth aspect of embodiments of the present disclosure, performed by a network, which includes:

a first receiving module, configured to receive registration complete information sent by a first SIM in a terminal, wherein the registration complete information carries paging collision information; and a resolution module, configured to determine first collision resolution information according to the paging collision information, and send the first collision resolution information to the first SIM, wherein the first collision resolution information is used to update a first paging occasion (PO) corresponding to the first SIM.

An electronic device is provided by the fifth aspect of embodiments of the present disclosure, which includes:

a processor; and a memory storing instructions executable by the processor;

wherein, the processor is configured to perform the method performed by a terminal.

An electronic device is provided by the sixth aspect of embodiments of the present disclosure, which includes:

a processor; and a memory storing instructions executable by the processor;

wherein, the processor is configured to perform the method performed by a network.

A computer readable storage medium storing a computer program is provided by the seventh aspect of embodiments of the present disclosure, wherein the program is executed by a processor to perform the method performed by a terminal.

A computer readable storage medium storing a computer program is provided by the eighth aspect of embodiments of the present disclosure, wherein the program is executed by a processor to perform the method performed by a network.

According to the embodiments of the present disclosure, it can be determined during the registration process of the first SIM whether there is a paging collision between the first PO and the second PO, since the registration process of the first SIM is the earliest process during which the first PO is able to be determined, therefore it can be timely determined whether there is a paging collision between the first PO and the second PO, and when a collision occurs, the paging collision information can be timely sent to the network, then, according to the first collision resolution information sent back from the network, the collision between the first PO and the second PO can be timely solved.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without inventive efforts.

FIG. 1 is a flow diagram of a method of solving paging collision according to an embodiment of the present disclosure;

FIG. 2 is another flow diagram of a method of solving paging collision according to an embodiment of the present disclosure;

FIG. 3 is another flow diagram of a method of solving paging collision according to an embodiment of the present disclosure;

FIG. 4 is another flow diagram of a method of solving paging collision according to an embodiment of the present disclosure;

FIG. 6 is another flow diagram of a method of solving paging collision according to an embodiment of the present disclosure;

FIG. 7 is another flow diagram of a method of solving paging collision according to an embodiment of the present disclosure;

4

Figure 9:
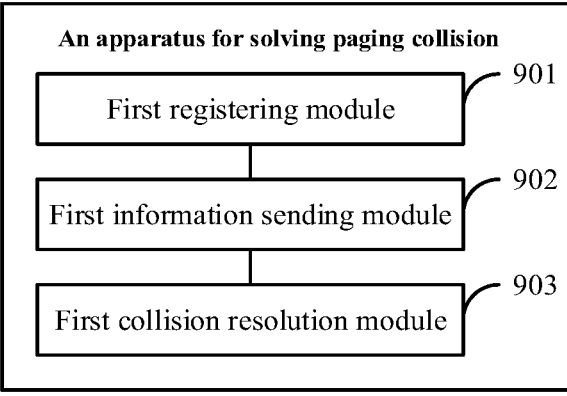
Figure 10:
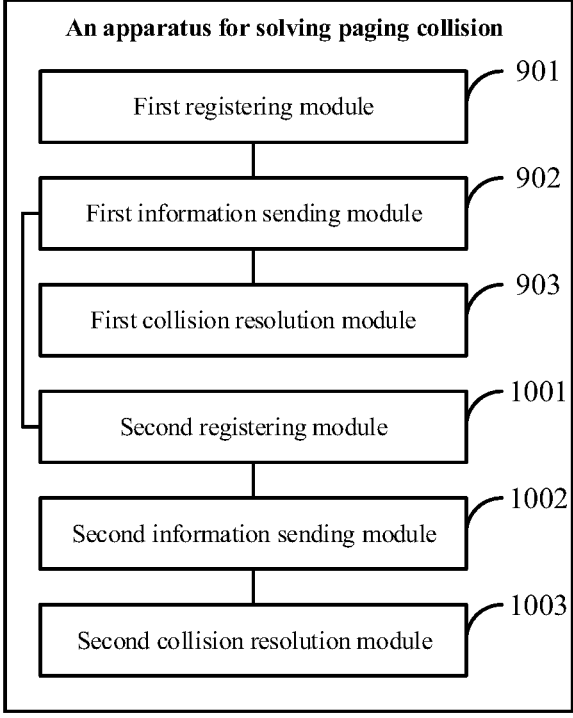
Figure 11:
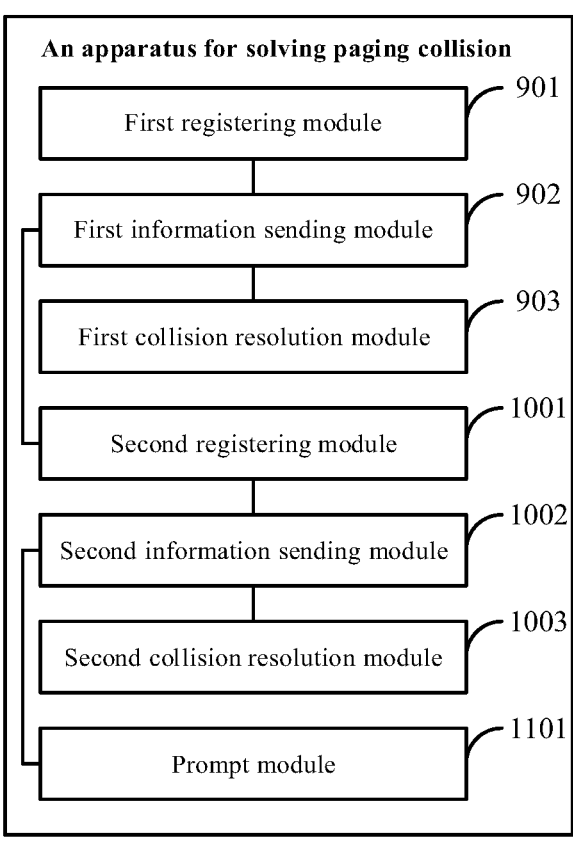
Figure 12:
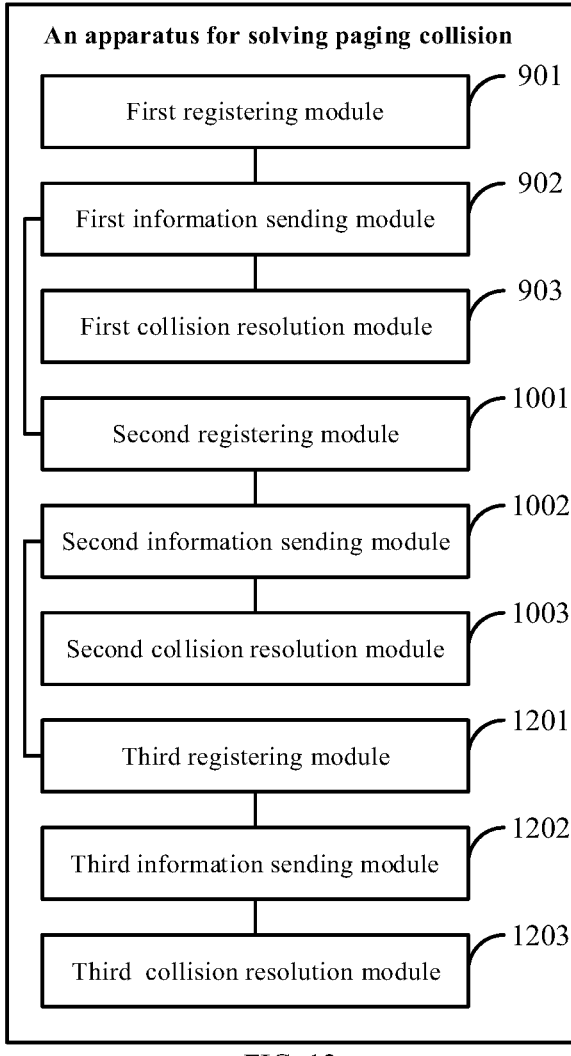
Figure 13:
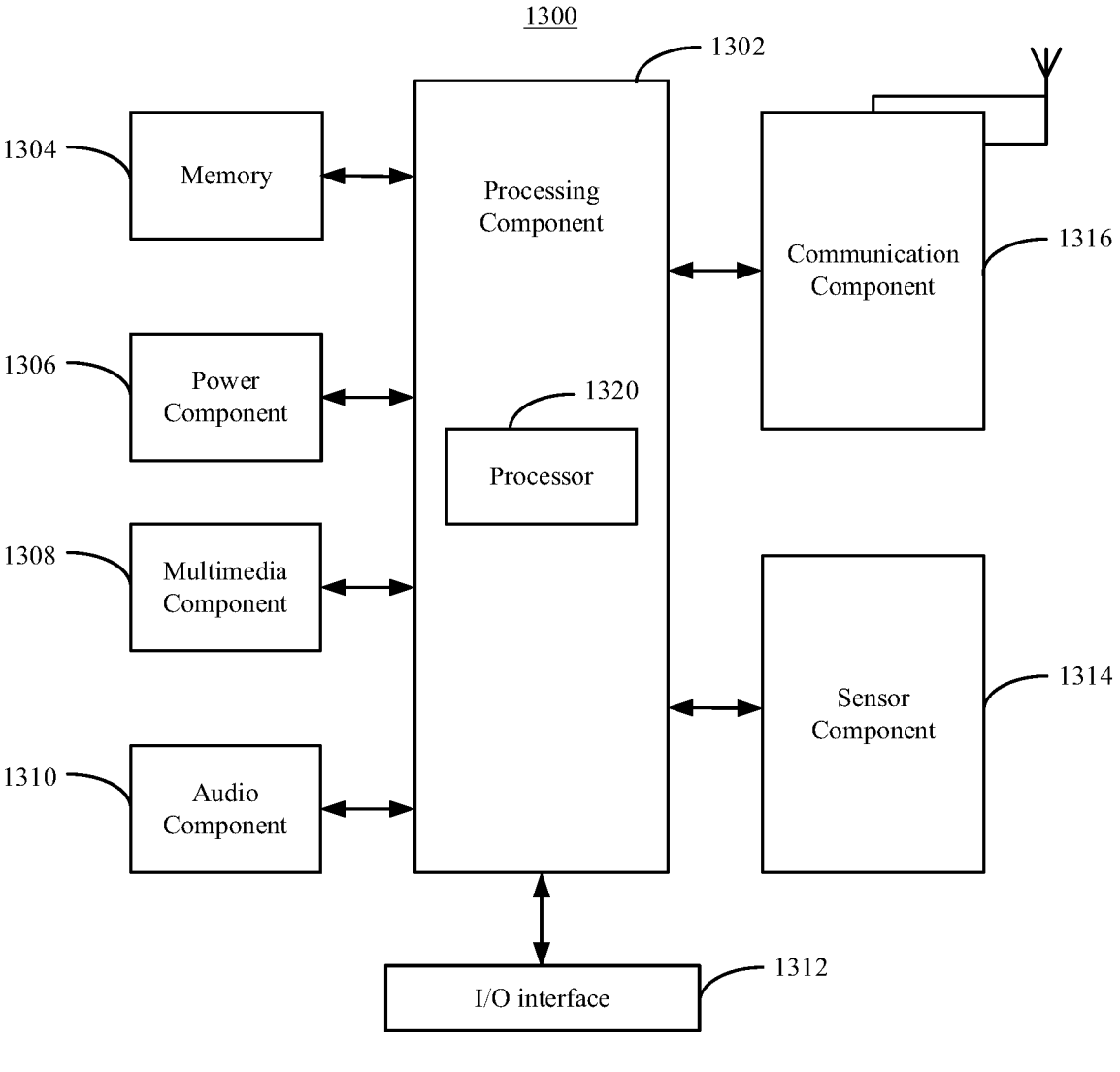

FIG. 9 is is a block diagram of an apparatus for solving paging collision according to an embodiment of the present disclosure;

FIG. 10 is another block diagram of an apparatus for solving paging collision according to an embodiment of the present disclosure;

FIG. 11 is another block diagram of an apparatus for solving paging collision according to an embodiment of the present disclosure;

FIG. 12 is another block diagram of an apparatus for solving paging collision according to an embodiment of the present disclosure; and FIG. 13 is another block diagram of an apparatus for solving paging collision according to an embodiment of the present disclosure.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of them. All other embodiments obtained by a person of ordinary skill in the art based on the embodiments of the present disclosure without creative efforts shall fall within the protection scope of the present disclosure.

FIG. 1 is a flow diagram of a method of solving paging collision according to an embodiment of the present disclosure; The paging collision resolution method shown in the present embodiments may be applied to a terminal, herein the terminal includes, but is not limited to, mobile phones, tablets, wearable devices, sensors, Internet of Things devices and other electronic devices. The terminal may communicate with the base station as an user equipment (UE), herein the base station includes, but not limited to a base station in a communication system such as a 4G base station, a 5G base station, a 6G base station, etc.

Multiple SIMs may be set in the terminal, for example, it may be a Universal Subscriber Identity Module (USIM), and the multiple SIMs may belong to the same network or different networks of one or more mobile operators. The following is some examples of the technical solutions in the present disclosure, mainly for the case where at least a first SIM card and a second SIM card are set in the terminal.

As shown in FIG. 1, the method of solving paging collision may include the following steps:

in step S101, registering with a network through the first SIM, receiving a first registration success message, and determining a first paging occasion (PO) corresponding to the first SIM according to the first registration success message;

in step S102, in response to determining that a collision occurs between the first PO and a second PO corresponding to the second SIM, sending paging collision information in registration complete information to the network through the first SIM, wherein, the second SIM has completed registration;

in step S103, receiving first collision resolution information determined by the network according to the paging collision information; and updating the first PO according to the first collision resolution information.

In an embodiment, when the second SIM has completed registration, registration with a network can be made through the first SIM, for example, registering with a network of a mobile operator to which the first SIM belongs (such as the first core network). When the second SIM has completed registration, for example, registering with a network of a mobile operator to which the second SIM belongs (such as, the second core network), and the registration has been completed. Wherein, the first SIM and the second SIM may belong to the same operator or different operators.

The network can send back the first registration success message to the first SIM, such as a registration accept message. The first SIM can determine the first PO corresponding to the first SIM according to the first registration success message. For example, the first registration success message can carry the UE identifier corresponding to the first SIM, the first SIM card can perform a calculation based on the UE identifier to obtain the first paging opportunity (PO), and then, based on the first PO, the first SIM card can monitor the paging messages broadcast by the corresponding base station in the network.

In the case that the second SIM has also completed registration, the base station can determine the UE identifier corresponding to the second SIM, and then determine the second PO corresponding to the second SIM according to the UE identifier corresponding to the second SIM, the terminal can receive the paging message through the first SIM at the first PO, and receive the paging message through the second SIM at the second PO, if there is a collision between the first PO and the second PO, for example, the first PO and the second PO overlap in one or more of the time domain or the frequency domain, which will affect the terminal receiving paging messages.

In the case of determining that a collision occurs between the first PO and the second PO, the first SIM can send registration complete information to the network and add paging collision information to the registration complete information.

In an embodiment, the paging collision information may include one or more of time domain resources or frequency domain resources when a collision occurs between the first PO and the second PO, then the network can specifically determine how the collision occurs between the first PO and the second PO, then the first collision resolution information can be generated in a targeted manner and sent back to the terminal, then the terminal updates the first PO according to the first collision resolution information, and the updated first PO can accurately keep away from the collision with the second PO, thereby it can avoid the collision with the second PO.

Wherein, the first collision resolution information can be carried in the Non-Access Stratum (NAS) signaling (such as a UE configuration update signaling) and sent to the first SIM.

In an embodiment, the paging collision information may also include one or more of the time domain resources or the frequency domain resources corresponding to the second PO. Accordingly, the network can determine the time-frequency resources corresponding to the second PO, thus specifically determine other time-frequency resources as the time-frequency resources corresponding to the new first PO that can completely stay away from the time-frequency resources corresponding to the second PO, and then determine the first collision resolution information based on other time-frequency resources.

In an embodiment, paging collision information may also include paging collision indication information, so that the network, after receiving the paging collision information, based on the paging collision indication information in it, can determine that one or more of the time domain resources or frequency domain resources in the paging collision information are targeted for the paging collision.

In an embodiment, determining a collision occurs between the first PO and the second PO may include: the terminal determines that a collision has occurred between the first PO and the second PO, or the terminal determines that a collision will occur between the first PO and the second PO (e.g., in a short period of time after the current moment).

In an embodiment, if the collision between the first PO and the second PO meets the preset conditions, then the first SIM can carry the paging collision information to the network in the registration complete information, wherein the preset conditions include, but are not limited to, for the first PO and the second PO, their overlapping time domain resources or frequency domain resources, or both, are greater than a preset value, or the number of overlaps between the first PO and the second PO is greater than the preset number.

According to the embodiments of the present disclosure, it can be determined during the registration process of the first SIM whether there is a paging collision between the first PO and the second PO, since the registration process of the first SIM is the earliest process during which the first PO is able to be determined, therefore it can be timely determined whether there is a paging collision between the first PO and the second PO, and when a collision occurs, the paging collision information can be timely sent to the first core network, then, according to the first collision resolution information sent back from the first core network, the collision between the first PO and the second PO can be timely solved.

FIG. 2 is another flow diagram of a method of solving paging collision according to an embodiment of the present disclosure; As shown in FIG. 2, the first collision resolution information includes a new UE identifier corresponding to the first SIM, and updating the first PO according to the first collision resolution information includes:

in step S201, computing a new first PO according to the new UE identifier.

In an embodiment, the network, according to the paging collision information, can determine the specific time domain resources and frequency domain resources in which a collision occurs between the first PO and the second PO, and then a UE identifier can be selected among the available UE identifiers to calculate the alternative PO, then detect whether there is a collision between the alternative PO and the resources in the paging collision information, carry the UE identifier corresponding to the alternative PO that can avoid a collision as the first collision resolution information, and send it to the first SIM.

Wherein, a UE identifier includes but is not limited to IMSI (International mobile subscriber identity), 5G-GUTI (Globally Unique Temporary UE Identity), etc.

The PO receiving the paging message can be calculated based on the UE identifier. After the first SIM receives the new UE identifier, the terminal can calculate the new first PO according to the new UE identifier, and then receive the paging message based on the new first PO in order to avoid collisions with the second PO.

FIG. 3 is another flow diagram of a method of solving paging collision according to an embodiment of the present disclosure; As shown in FIG. 3, the first collision resolution information includes an offset, and updating the first PO according to the first collision resolution information includes:

in step S301, computing the new first PO according to a user equipment (UE) identifier corresponding to the first SIM and the offset.

In an embodiment, the network, according to the paging collision information, can determine the specific time domain resources and frequency domain resources in which a collision occurs between the first PO and the second PO, and then based on an offset which can be selected among the available offsets and the UE identifier corresponding to the first SIM, obtain the alternative PO by computation, then detect whether there is a collision between the alternative PO and the resources in the paging collision information, carry the offset corresponding as the alternative PO that can avoid a collision to the first collision resolution information, and send it to the first SIM.

After receiving the offset, the first SIM can calculate a new first PO, according to the UE identifier corresponding to the first SIM and the offset, in order to avoid collisions between the new first PO and the second PO.

If the offset is an offset of the UE identifier, the offset can be added on the basis of the UE identifier corresponding to the first SIM, and based on the UE identifier and the offset, a new first PO can be obtained by computation; if the offset is the offset of the PO, an offset can be added to the first PO as the new first PO.

FIG. 4 is another flow diagram of a method of solving paging collision according to an embodiment of the present disclosure; As shown in FIG. 4, the first collision resolution information includes new computation manner information, and updating the first PO according to the first collision resolution information includes:

in step 401, based on the new computation manner information and the UE identifier corresponding to the first SIM, obtain a new PO by computation.

In an embodiment, the network, according to the paging collision information, can determine the specific time domain resources and frequency domain resources in which a collision occurs between the first PO and the second PO, and then a new computation manner can be selected among the available computation manner, which is used to obtain the alternative PO by computation based on the UE identifier corresponding to the first SIM, then detect whether there is a collision between the alternative PO and the resources in the paging collision information, carry the offset corresponding as the alternative PO that can avoid a collision to the first collision resolution information, and send it to the first SIM.

in step 402, after receiving the new computation manner information, the first SIM can determine the new computation manner for calculating the first PO according to the information, and then based on the UE identifier corresponding to the first SIM, obtain a new first PO by calculation according to the new computation manner, so that the new first PO can accurately stay away from the second PO, thereby avoiding the collision with the second PO. The new computation manner may be determined by choosing a different computation manner from the current one out of the existing paging strategy, or by creating a new computation manner, and no restrictions are placed on this in the present disclosure.

Figure 5:
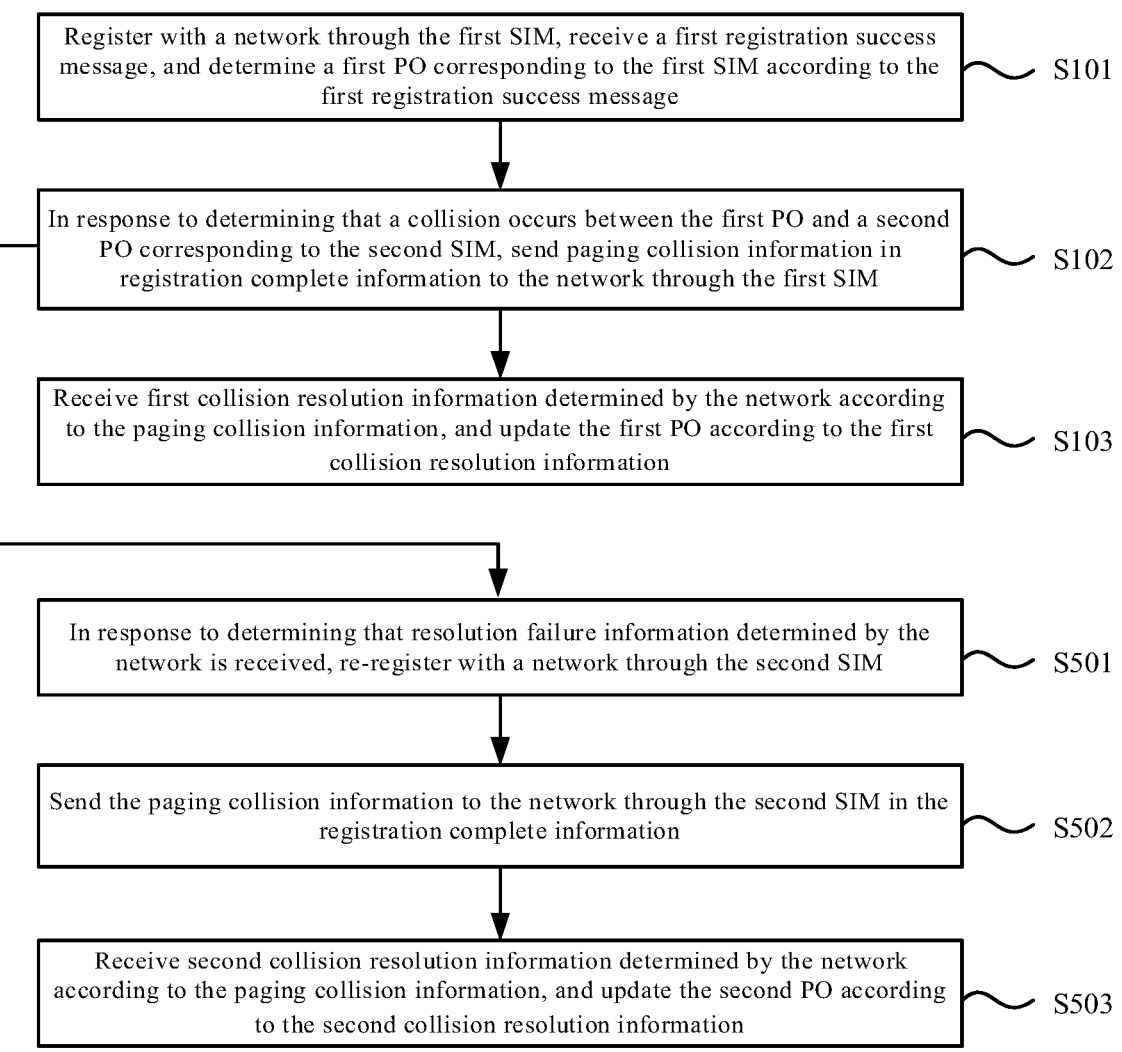
FIG. 5 is another flow diagram of a method of solving paging collision according to an embodiment of the present disclosure.

FIG. 5 is another flow diagram of a method of solving paging collision according to an embodiment of the present disclosure. As shown in FIG. 5, the method further includes:

in step 501, in response to determining that resolution failure information determined by the network is received, re-registering with a network through the second SIM;

in step 502, sending the paging collision information to the network through the second SIM in the registration complete information;

in step S503, receiving second collision resolution information determined by the network according to the paging collision information; and updating the second PO according to the second collision resolution information.

In an embodiment, in the case that the network of the operator to which the first SIM belongs cannot solve the collision between the first PO and the second PO, resolution failure information can be generated and sent to the first SIM, wherein the resolution failure information may be carried in the NAS signaling sent to the first SIM.

In this case, the terminal can determine that the network of the operator to which the first SIM belongs cannot solve the collision problem between the first PO and the second PO, then it can be tried to trigger the second SIM to start a registration process again, such as re-registering with the network of the operator to which the second SIM belongs through the second SIM, and then send the paging collision information to the network of the operator to which the second SIM belongs in the registration complete information through the second SIM. The network of the operator to which the second SIM belongs can determine the second collision resolution information based on the paging collision information.

Wherein, For the network of the operator to which the second SIM belongs, the way it determines the second collision resolution information based on the paging collision information is the same as the way described in the above embodiment, that is, the way for the network of the operator to which the first SIM belongs to determine the first collision resolution information based on the paging collision information, and will not be repeated herein.

Further, it may receive the second collision resolution information determined by the network of the operator to which the second SIM belongs according to the paging collision information, and then update the second PO according to the second collision resolution information. Since the capabilities of different core networks can be different, if the network of the operator to which the first SIM belongs cannot solve the paging collision, it can be tried to request the network of the operator to which the second SIM belongs to solve the paging collision in order to effectively solve the paging collision.

In an embodiment, it can be determined first whether the network of the operator to which the second SIM belongs and the network of the operator to which the first SIM belongs are the same core network. Only when they are not the same, steps S501 to S503 can be executed, while when they are the same, a prompt message can be generated.

FIG. 6 is another flow diagram of a method of solving paging collision according to an embodiment of the present disclosure; As shown in FIG. 6, the method further includes:

in step S601, in response to determining that resolution failure information determined by the network is received, generate prompt information.

In an embodiment, if the network of the operator to which the second SIM belongs cannot solve the collision between the first PO and the second PO, the network of the operator to which the second SIM belongs can send resolution failure information to the second SIM, in which case, the terminal can no longer trigger the first SIM card to start a registration process again, but instead generate prompt information to remind the user of the terminal that there is a collision between the first PO and the second PO, so as not to waste the communication resources between the terminal and the core network.

FIG. 7 is another flow diagram of a method of solving paging collision according to an embodiment of the present disclosure; As shown in FIG. 7, wherein the terminal also includes a third SIM, and the method further includes:

in step 701, in response to determining that resolution failure information determined by the network is received, re-registering with a network through the third SIM;

in step 702, sending the paging collision information to the network through the third SIM in the registration complete information;

in step 703, receiving third collision resolution information determined by the network according to the paging collision information; and updating one or more of the first PO or the second PO according to the third collision resolution information.

In an embodiment, when receiving the resolution failure information sent by the network of the operator to which the second SIM belongs, it can be determined that the network of the operator to which the second SIM belongs cannot solve the collision between the first PO and the second PO, and the network of the operator to which the first SIM belongs cannot solve the collision between the first PO and the second PO either, then in the case that there is a third SIM besides the first SIM and the second SIM in the terminal, the third SIM can be registered with the network of the operator to which the third SIM belongs (such as the third core network), and then the paging collision information is sent to the network of the operator to which the third SIM belongs in the registration complete information through the third SIM, and the network of the operator to which the third SIM belongs can determine third collision resolution information based on the paging collision information.

Wherein, For the network of the operator to which the third SIM belongs, the way it determines the third collision resolution information based on the paging collision information is the same as the way described in the above embodiments, that is, the way for the network of the operator to which the first SIM belongs to determine the first collision resolution information based on the paging collision information, and will not be repeated herein.

Further, it may receive the third collision resolution information determined by the network of the operator to which the third SIM belongs according to the paging collision information, and then update one or more of the first PO or the second PO according to the third collision resolution information. For example, it can be determined whether the third collision resolution information is targeted for the first PO or for the second PO, if for the first PO, then the first PO can be updated based on the third collision resolution information so that the new first PO can avoid a collision with the second PO; if for the second PO, then the second PO can be updated based on the third collision resolution information so that the new second PO can avoid a collision with the second PO. Since the capabilities of different core networks can be different, if the network of the operator to which the first SIM belongs and the network of the operator to which the second SIM belongs cannot solve the paging collision, it can be tried to request the network of the operator to which the third SIM belongs to solve the paging collision, so as to effectively solve the paging collision.

In an embodiment, steps S701 to S703 may be executed through all other SIM besides the first SIM and the second SIM in the terminal, that is, considering one SIM other than the first SIM and the second SIM as the third SIM, and performing the above steps S701 to step S703, if the paging collision cannot be solved, then another SIM card is considered as the third SIM to perform the above steps S701 to step S703 until the paging collision is solved, or until all other SIMs are traversed.

Figure 8:
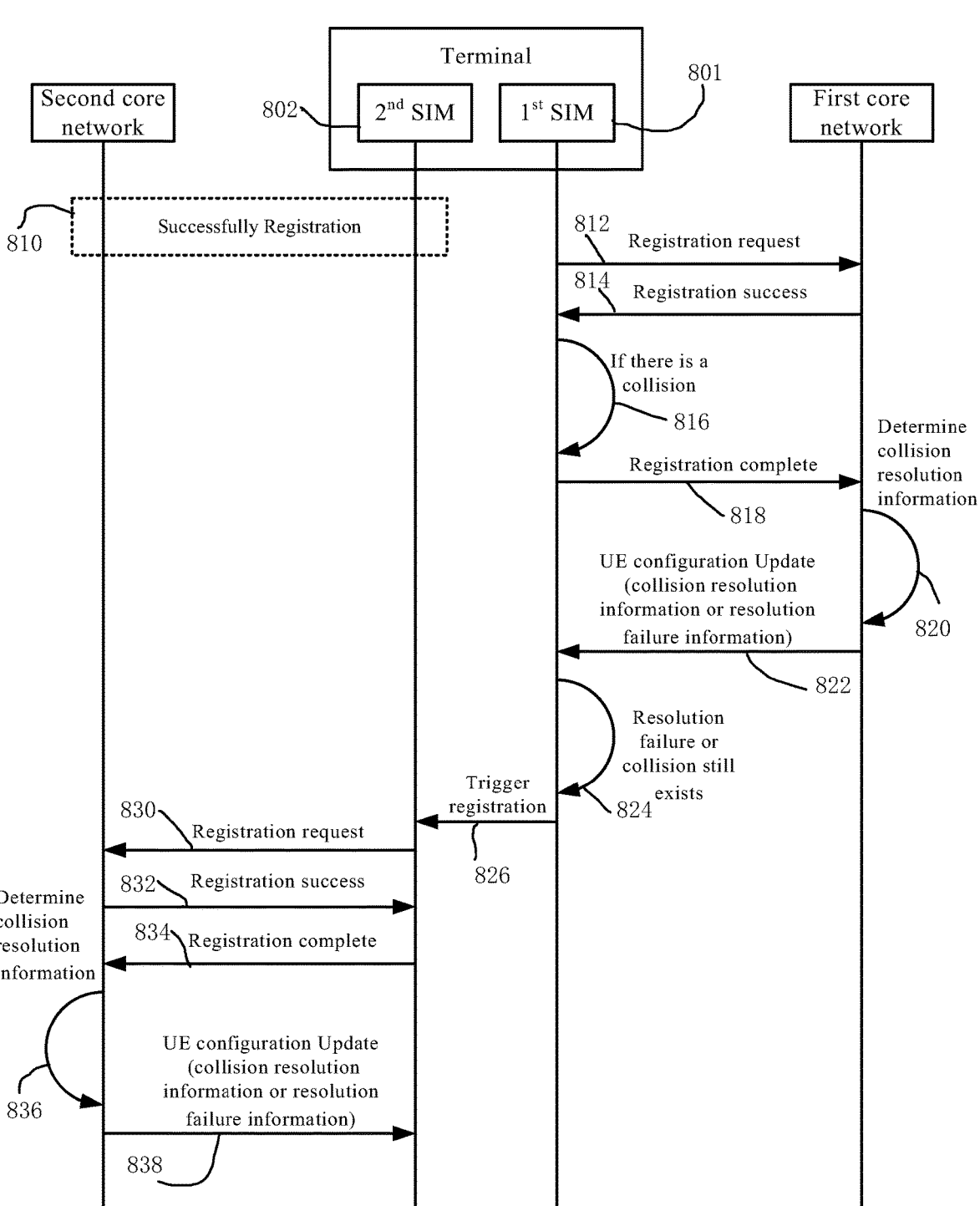
FIG. 8 is another flow diagram of a method of solving paging collision according to an embodiment of the present disclosure.

FIG. 8 is another flow diagram of a method of solving paging collision according to an embodiment of the present disclosure; As shown in FIG. 8, as shown in FIG. 8, in the case that the second SIM 802 has completed the registration (Successful Registration 810), the terminal can register 812 with the first core network through the first SIM 801, and receive at 814 the first registration success message sent by the first core network 803, based on the first registration success message, the first PO corresponding to the first SIM can be determined, and then it can be determined whether there is a collision between the first PO and the second PO corresponding to the second SIM.

If the first PO avoids a collision with the second PO (and other POs corresponding to other SIM in the terminal), then the registration complete message sent to the first core network can carry none of the relevant paging collision information; if a collision occurs 816 between the first PO and the second PO, the registration complete message 818 sent to the first core network 803 can carry the relevant paging collision information, specifically the registration complete message can be sent to the core network AMF (Access and Mobility Management Function).

The first core network may generate first collision resolution information 820 based on the paging collision information and send it back 822 to the first SIM, or send back the resolution failure information to the first SIM if the collision problem cannot be solved. In the case of returning the first collision resolution information to the first SIM, the terminal can determine the new updated first PO based on the first collision resolution information, so that the new first PO can avoid a collision with the second PO.

In the case that the first SIM receives the resolution failure information 824, or there is still a collision occurs between the new first PO and the second PO, the second SIM can be triggered 826 to start 830 the registration with the second core network, and the second core network 802 can generate a second collision resolution information based on the paging collision information and send it back 832 to the second SIM, or send back the resolution failure information to the second SIM if the collision problem cannot be solved.

In the case of returning the second collision resolution information 836 to the second SIM, the terminal can determine whether the second collision resolution information is for the first PO or for the second PO; if for the first PO, then the first PO can be updated based on the second collision resolution information 838, so that the new first PO can avoid a collision with the second PO; if for the second PO, then the second PO can be updated based on the second collision resolution information, so that the resulting new second PO can avoid a collision with the first PO.

The method of solving paging collision shown in the present embodiments may be applied to a network, wherein the network includes, but is not limited to, a core network of a mobile operator. The core network can communicate with a terminal, which includes but is not limited to mobile phones, tablets, wearable devices, sensors, Internet of Things devices, and other electronic devices.

Multiple SIMs may be set in the terminal, for example, it may be a USIM, and the multiple SIMs may belong to the same network or different networks of one or more mobile operators. The following are some examples of the technical solutions in the present disclosure, mainly for the case where at least a first SIM card and a second SIM card are set in the terminal.

The method of solving paging collision may include the following steps:

receiving registration complete information sent by a first SIM in a terminal, wherein the registration complete information carries paging collision information;

determining first collision resolution information according to the paging collision information, sending the first collision resolution information to the first SIM, wherein the first collision resolution information is used to update a first paging occasion (PO) corresponding to the first SIM.

In an embodiment, the paging collision information may include one or more of time domain resources or frequency domain resources when a collision occurs between the first PO and the second PO, then the network can specifically determine how the collision occurs between the first PO and the second PO, then the first collision resolution information can be generated in a targeted manner and sent back to the terminal, then the terminal updates the first PO according to the first collision resolution information, and the updated first PO can accurately keep away from the collision with the second PO, thereby it can avoid the collision with the second PO.

Wherein, the first collision resolution information can be carried in the Non-Access Stratum (NAS) signaling (such as a UE configuration update signaling) and sent to the first SIM.

In an embodiment, the paging collision information may also include one or more of the time domain resources or the frequency domain resources corresponding to the second PO. Accordingly, the network can determine the time-frequency resources corresponding to the second PO, thus specifically determine other time-frequency resources as the time-frequency resources corresponding to the new first PO that can completely stay away from the time-frequency resources corresponding to the second PO, and then determine the first collision resolution information based on other time-frequency resources.

According to the embodiments of the present disclosure, paging collision information can be received during the registration process of the first SIM, and collision resolution information can be sent to the first SIM. Since the registration process of the first SIM is the earliest process in which the terminal can determine the first PO, it can determine in time whether a collision occurs between the first PO and the second PO, and return the collision resolution information by the network in time in the case of collision, and then solve the collision between the first PO and the second PO in time according to the first collision resolution information returned by the network.

Optionally, the first collision resolution information includes a new user equipment (UE) identifier corresponding to the first SIM.

Optionally, the first collision resolution information includes an offset.

Optionally, the first collision resolution information includes computation manner information, wherein the computation manner information is used to instruct the terminal to determine a new computation manner for calculating the first PO corresponding to the first SIM.

Optionally, the method further includes:

receiving registration complete information sent by a second SIM in the terminal, wherein the registration complete information sent by the second SIM carries the paging collision information;

determining second collision resolution information according to the paging collision information; and sending the second collision resolution information to the second SIM, wherein the second collision resolution information is used to update a second PO corresponding to the second SIM.

Optionally, the method further includes:

receiving registration complete information sent by a third SIM in the terminal, wherein the registration complete information sent by the third SIM carries the paging collision information;

determining third collision resolution information according to the paging collision information; and sending the third collision resolution information to the third SIM, wherein the third collision resolution information is used to update one or more of the first PO corresponding to the first SIM or a second PO corresponding to a second SIM.

Corresponding to the aforementioned embodiments of the methods of solving paging collision, the present disclosure also provides the embodiments of the apparatuses for solving paging collision.

FIG. 9 is is a block diagram of an apparatus for solving paging collision according to an embodiment of the present disclosure; The apparatuses for solving paging collision shown in the present embodiments may be applied to a terminal, herein the terminal includes, but is not limited to, mobile phones, tablets, wearable devices, sensors, Internet of Things devices and other electronic devices. The terminal may communicate with the base station as a user equipment (UE), herein the base station includes, but is not limited to, a base station in a communication system such as a 4G base station, a 5G base station, a 6G base station, etc.

Multiple SIMs may be set in the terminal, and the multiple SIMs may belong to the same network or different networks of one or more mobile operators. The following is some examples of the technical solutions in the present disclosure, mainly for the case where at least a first SIM card and a second SIM card are set in the terminal.

As shown in FIG. 9, the apparatus may include:

a first registering module 901, configured to register with a network through the first SIM, receive a first registration success message, and determine a first PO corresponding to the first SIM according to the first registration success message;

a first information sending module 902, configured to send paging collision information in registration complete information to the network through the first SIM in response to determining that a collision occurs between the first PO and a second PO corresponding to the second SIM, wherein the second SIM has completed registration;

a first collision resolution module 903, configured to receive first collision resolution information determined by the network according to the paging collision information, and update the first PO according to the first collision resolution information.

Optionally, the first collision resolution information includes a new user equipment (UE) identifier corresponding to the first SIM, and the collision resolution module is configured to calculate a new PO based on the new UE identifier.

Optionally, the first collision resolution information includes an offset, and the first collision resolution module is configured to calculate a new PO based on the new UE identifier corresponding to the first SIM and the offset.

Optionally, the first collision resolution information includes new computation manner information, and and the first collision resolution module is configured to obtain a new PO by computing the new UE identifier corresponding to the first SIM according to the new computation manner.

FIG. 10 is another block diagram of an apparatus for solving paging collision according to an embodiment of the present disclosure; As shown in FIG. 10, the apparatus further includes:

a second registering module 1001, configured to re-register with a network through the second SIM in response to determining that resolution failure information determined by the network is received;

a second information sending module 1002, configured to send the paging collision information to the network through the second SIM in the registration complete information;

a second collision resolution module 1003, configured to receive second collision resolution information determined by the network according to the paging collision information, and update the second PO according to the second collision resolution information.

FIG. 11 is another block diagram of an apparatus for solving paging collision according to an embodiment of the present disclosure; As shown in FIG. 11, the apparatus further includes:

a prompt module 1101, configured to generate prompt information in response to determining that resolution failure information determined by the network is received.

FIG. 12 is another block diagram of an apparatus for solving paging collision according to an embodiment of the present disclosure. As shown in FIG. 12, the terminal also includes a third SIM, and the apparatus further includes:

a third registering module 1201, configured to re-register with a network through the third SIM in response to determining that resolution failure information determined by the network is received;

a third information sending module 1202, configured to send the paging collision information to the network through the third SIM in the registration complete information;

a third collision resolution module 1203, configured to receive third collision resolution information determined by the network according to the paging collision information, and update one or more of the first PO or the second PO according to the third collision resolution information.

The apparatus for solving paging collision shown in the present embodiments may be applied to a network, wherein the network includes, but is not limited to, a core network of a mobile operator. The core network can communicate with a terminal, which includes but is not limited to mobile phones, tablets, wearable devices, sensors, Internet of Things devices, and other electronic devices.

Multiple SIMs may be set in the terminal, for example, it may be a USIM, and the multiple SIMs may belong to the same network or different networks of one or more mobile operators. The following are some examples of the technical solutions in the present disclosure, mainly for the case where at least a first SIM card and a second SIM card are set in the terminal.

The apparatus for solving paging collision may include:

An apparatus for solving paging collision, performed by a network, which includes:

a first receiving module, configured to receive registration complete information sent by a first SIM in a terminal, wherein the registration complete information carries paging collision information; and a resolution module, configured to determine first collision resolution information according to the paging collision information, and send the first collision resolution information to the first SIM, wherein the first collision resolution information is used to update a first paging occasion (PO) corresponding to the first SIM.

Optionally, the first collision resolution information includes a new user equipment (UE) identifier corresponding to the first SIM.

Optionally, the first collision resolution information includes an offset.

Optionally, the first collision resolution information includes computation manner information, wherein, the computation manner information is used to instruct the terminal to determine a new computation manner for calculating the first PO corresponding to the first SIM.

Optionally, the apparatus also includes:

a second receiving module, configured to receive registration complete information sent by a second SIM in the terminal, wherein the registration complete information sent by the second SIM carries the paging collision information;

a second resolution module, configured to determine second collision resolution information according to the paging collision information, and send the second collision resolution information to the second SIM, wherein the second collision resolution information is used to update a second PO corresponding to the second SIM.

Optionally, the apparatus also includes:

a third receiving module, configured to receive registration complete information sent by a third SIM in the terminal, wherein the registration complete information sent by the second SIM carries the paging collision information;

a third resolution module, configured to determine third collision resolution information according to the paging collision information, and send the third collision resolution information to the third SIM, wherein the third collision resolution information is used to update one or more of the first PO corresponding to the first SIM or a second PO corresponding to a second SIM.

With regard to the device in the above examples, the specific manner in which the respective modules perform the operations has been described in detail in the examples of the related methods, and will not be explained in detail herein.

For the embodiments of the apparatus, since they basically correspond to the embodiments of the method, they may be referred to the description of the embodiments of the method. The apparatus embodiments described above are for illustrative purposes only, and the modules described as separate components may or may not be physically separated, and the components displayed as modules may or may not be physical modules, that is, may be located in one place, or can be distributed to multiple network modules. Part or all of the modules may be selected according to actual requirements to implement the objectives of the solutions in the examples. Those of ordinary skill in the art can understand and implement the present disclosure without any creative effort.

The present disclosure also proposes an electronic device, including:

a processor; and a memory storing instructions executable by the processor;

wherein, the processor is configured to perform the method performed by a terminal.

A computer readable storage medium storing a computer program is provided by the present disclosure, wherein the program is executed by a processor to perform the steps in the above method performed by a terminal.

The present disclosure also proposes an electronic device, including:

a processor; and a memory storing instructions executable by the processor;

wherein, the processor is configured to perform the method performed by a terminal.

A computer readable storage medium storing a computer program is provided by the present disclosure, wherein the program is executed by a processor to perform the steps in the above method performed by a terminal.

FIG. 13 is another block diagram of an apparatus for solving paging collision according to an embodiment of the present disclosure; For example, device 1300 can be a mobile phone, a computer, a digital broadcast terminal, a message transmitting and receiving device, a gaming console, a tablet device, a medical device, a fitness device, a personal digital assistant, etc.

Referring to FIG. 13, device 1300 can include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls overall operations of the apparatus 1300, such as operations related to display, a telephone call, data communication, a camera, and a recording operation. The processing assembly 1302 may include one or more processors 1320 to execute instructions to complete all or a part of the blocks of the above methods. In addition, the processing component 1302 may include one or more modules to facilitate the interaction between the processing component 1302 and other components. For example, the processing component 1302 may include a multimedia module to facilitate the interaction between the multimedia component 1308 and the processing component 1302.

The memory 1304 is configured to store different types of data to support the operations of the electronic device 1300. Examples of such data include instructions, contact data, phonebook data, messages, pictures, videos, and so on for any application or method that operates on the apparatus 1300. The memory 1304 may be implemented by any type of volatile or non-volatile memory device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power supply component 1306 provides power for different components of the electronic device 1300. The power supply component 1306 may include a power management system, one or more power sources, and other components associated with generating, managing, and distributing power for the electronic device 1300.

The multimedia component 1308 includes a screen for providing an output interface between the apparatus 1300 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 1308 may include a front camera and/or a rear camera. When the device 1300 is in an operation mode, such as a shooting mode or a video mode, the front camera and/or the rear camera can receive external multimedia data. Each of the front and rear cameras may be a fixed optical lens system or have focal length and optical zooming capability.

The audio component 1310 is configured to output and/or input an audio signal. For example, the audio component 1310 includes a microphone (MIC). When the electronic device 1300 is in an operating mode, such as a call mode, a recording mode and a speech recognition mode, the microphone is configured to receive an external audio signal. The received audio signal may be further stored in the memory 1304 or sent via the communication component 1316. In some embodiments, the audio component 1310 also includes a speaker for outputting an audio signal.

The I/O interface 1312 may provide an interface between the processing component 1302 and peripheral interface modules. The above peripheral interface modules may include a keyboard, a click wheel, buttons and so on. These buttons may include but not limited to, a home button, a volume button, a start button and a lock button.

The sensor component 1314 includes one or more sensors for providing state assessments in different aspects for the apparatus 1300. For example, sensor component 1314 can detect an open/closed state of device 1300, a relative positioning of components, such as the display and keypad of device 1300, and sensor component 1314 can also detect a change in position of device 1300 or a component of device 1300, the presence or absence of user contact with device 1300, orientation or acceleration/deceleration of device 1300, and temperature change of device 1300. The sensor component 1314 may include a proximity sensor for detecting the existence of a nearby object without any physical touch. The sensor component 1314 may also include a Complementary Metal-Oxide-Semiconductor (CMOS) or Charged Coupled Device (CCD) image sensor applied in an imaging application. In some embodiments, the sensor component 1314 may also include an acceleration sensor, a gyro sensor, a magnetic sensor, a pressure sensor, or a temperature sensor.

The communication component 1316 is configured to facilitate wired or wireless communication between the apparatus 1300 and other devices. The apparatus 1300 may access a wireless network based on a communication standard, such as WiFi, 2G or 3G, 4G LTE, 5G NR, or a combination thereof. In an illustrative embodiment, the communication component 1316 receives a broadcast signal or broadcast related information from an external broadcast management system via a broadcast channel. In an illustrative embodiment, the communication component 1316 may also include a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth (BT) technology and other technologies.

In illustrative embodiments, the apparatus 1300 may be implemented by one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic elements, for executing the method in any one of the above examples.

In illustrative embodiments, a non-transitory computer readable storage medium including instructions, such as the memory 1304 containing instructions, is also provided. The above instructions may be executed by the processor 1320 of the apparatus 1300 to complete the above method. For example, the non-transitory computer readable storage medium may be a Read-Only Memory (ROM), a Random Access Memory (RAM), a CD-ROM, a magnetic tape, a floppy disk, an optical data storage device, etc.

After considering the specification and practicing the present disclosure, the skilled in the art may easily conceive of other implementations of the present disclosure. The present disclosure is intended to cover any variations, uses, modification or adaptations of the present disclosure that follow the general principles thereof and include common knowledge or conventional technical means in the art that are not disclosed in the present disclosure. The specification and examples herein are intended to be illustrative only, and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

It is to be noted that the relational terms such as "first" and "second" used herein are merely intended to distinguish one entity or operation from another entity or operation rather than to require or imply any such actual relation or order existing between these entities or operations. Also, the term "including", "comprising" or any variation thereof is intended to encompass non-exclusive inclusion, so that a process, method, article or device including a series of elements includes not only those elements but also other elements not listed explicitly or those elements inherent to such a process, method, product or device. Without more restrictions, the elements defined by the sentence "including a . . . " do not exclude the existence of other identical elements in the process, method, product, or device.

The method and apparatus provided by the present disclosure are described above in detail. The principles and implementations of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A method of solving paging collision, performed by a terminal, in which at least a first Subscriber Identity Module (SIM) and a second SIM are set, the method comprising:
registering with a first network device through the first SIM;
receiving a first registration success message;
determining a first paging occasion (PO) corresponding to the first SIM according to the first registration success message;
determining that a collision occurs between the first PO and a second PO corresponding to the second SIM;
sending paging collision information to the first network device through the first SIM;
receiving first collision resolution information determined by the first network device according to the paging collision information; and
updating the first PO according to the first collision resolution information;
wherein the first collision resolution information comprises an offset, and updating the first PO according to the first collision resolution information comprises:
computing a new first PO according to a user equipment (UE) identifier corresponding to the first SIM and the offset.

2. The method according to claim 1, wherein the first collision resolution information comprises a new UE identifier corresponding to the first SIM, and updating the first PO according to the first collision resolution information comprises:
computing a new first PO according to the new UE identifier.

3. The method according to claim 1, wherein the first collision resolution information comprises new computation manner information, and updating the first PO according to the first collision resolution information comprises:
computing the new first PO according to the new computation manner information and a user equipment (UE) identifier corresponding to the first SIM.

4. The method according to claim 1, further comprising:
determining that resolution failure information determined by the first network device is received;
re-registering with a second network device through the second SIM;
sending the paging collision information to the second network device through the second SIM in the registration complete information;
receiving second collision resolution information determined by the second network device according to the paging collision information; and
updating the second PO according to the second collision resolution information.

5. The method according to claim 4, further comprising:
determining that resolution failure information determined by the second network device is received;
generating prompt information.

6. The method according to claim 4, wherein the terminal further comprises a third SIM, and the method further comprises:
determining that resolution failure information determined by the second network device is received;
re-registering with a third network device through the third SIM;
sending the paging collision information to the third network device through the third SIM in the registration complete information;

receiving third collision resolution information determined by the third network device according to the paging collision information; and updating one or more of the first PO or the second PO according to the third collision resolution information.

7. A non-transitory computer readable storage medium storing a computer program, wherein the program is executed by a processor to perform the method according to claim 1.

8. A method of solving paging collision, performed by a network device, comprising:

receiving paging collision information sent by a first Subscriber Identity Module (SIM) in a terminal;

determining first collision resolution information according to the paging collision information; and sending the first collision resolution information to the first SIM, wherein the first collision resolution information is used to update a first paging occasion (PO) corresponding to the first SIM, wherein the first collision resolution information comprises an offset, and the first collision resolution information is used to instruct the terminal to compute a new first PO according to a user equipment (UE) identifier corresponding to the first SIM and the offset.

9. The method according to claim 8, wherein the first collision resolution information comprises a new UE identifier corresponding to the first SIM.

10. The method according to claim 8, wherein the first collision resolution information comprises computation manner information, and the computation manner information is used to instruct the terminal to determine a new calculation manner for calculating the first PO corresponding to the first SIM.

11. A communication device, comprising:

a processor; and a memory storing instructions executable by the processor;

wherein the processor is configured to perform the method according to claim 8.

12. A non-transitory computer readable storage medium storing a computer program, wherein the program is executed by a processor to perform the method according to claim 8.

13. A communication device, in which at least a first Subscriber Identity Module (SIM) and a second SIM are set, comprising:

a processor; and a memory storing instructions executable by the processor;

wherein the processor is configured to perform the following operations:

registering with a first network device through the first SIM;

receiving a first registration success message;

determining a first paging occasion (PO) corresponding to the first SIM according to the first registration success message;

determining that a collision occurs between the first PO and a second PO corresponding to the second SIM:

sending paging collision information to the first network device through the first SIM;

receiving first collision resolution information determined by the first network device according to the paging collision information; and updating the first PO according to the first collision resolution information;

wherein the first collision resolution information comprises an offset, and updating the first PO according to the first collision resolution information comprises:

computing a new first PO according to a user equipment (UE) identifier corresponding to the first SIM and the offset.

14. The communication device according to claim 13, wherein the first collision resolution information comprises a new UE identifier corresponding to the first SIM, and updating the first PO according to the first collision resolution information comprises:

computing a new first PO according to the new UE identifier.

15. The communication device according to claim 13, wherein the first collision resolution information comprises new computation manner information, and updating the first PO according to the first collision resolution information comprises:

computing the new first PO according to the new computation manner information and a user equipment (UE) identifier corresponding to the first SIM.

16. The communication device according to claim 13, wherein the processor is further configured to perform the following operations:

determining that resolution failure information determined by the first network device is received, re-registering with a second network device through the second SIM;

sending the paging collision information to the second network device through the second SIM in the registration complete information;

receiving second collision resolution information determined by the second network device according to the paging collision information; and updating the second PO according to the second collision resolution information.

17. The communication device according to claim 16, wherein the terminal further comprises a third SIM, and the processor is configured to perform the following operations:

determining that resolution failure information determined by the second network device is received, re-registering with a third network device through the third SIM;

sending the paging collision information to the third network device through the third SIM in the registration complete information;

receiving third collision resolution information determined by the third network device according to the paging collision information; and updating one or more of the first PO or the second PO according to the third collision resolution information.

* * * * *